United States Patent
Kern et al.

[15] 3,650,373
[45] Mar. 21, 1972

[54] CONVEYOR TRACK FOR ASSEMBLY LINE PRODUCTION

[72] Inventors: Georg Kern, Bad Salzdetfurth; Heinz Wilke, Hildesheim, both of Germany

[73] Assignee: Robert Bosch GmbH, Stuttgart, Germany

[22] Filed: Aug. 19, 1969

[21] Appl. No.: 851,277

[52] U.S. Cl. ................................. 198/85, 198/19, 29/33.12
[51] Int. Cl. ............................................... B65g 37/00
[58] Field of Search ........................... 198/19, 85; 29/33.12

[56] References Cited

UNITED STATES PATENTS

| | | | |
|---|---|---|---|
| 1,093,815 | 4/1914 | Whittier | 198/9 |
| 2,455,175 | 11/1948 | Hohl | 198/19 |
| 2,861,672 | 11/1958 | Buhrer et al. | 198/85 |
| Re25,886 | 10/1965 | Cargill | 29/33.12 |

FOREIGN PATENTS OR APPLICATIONS

| | | | |
|---|---|---|---|
| 47,193 | 5/1919 | Sweden | 198/85 |

Primary Examiner—Harvey C. Hornsby
Assistant Examiner—Merle F. Maffei
Attorney—Edwin E. Greigg

[57] ABSTRACT

The invention relates to a conveyor system having spaced, parallel horizontally extending continuously traveling endless belts having upper and lower flights arranged to feed workpieces to work stations spaced along the conveyor. The system also includes transfer devices for shifting work carriers between the respective flights of the conveyor subsequent to passing the last work station and preparatory for the next cycle of operation.

8 Claims, 3 Drawing Figures

Patented March 21, 1972

INVENTORS:
Georg KERN
Heinz WILKE their ATTORNEY

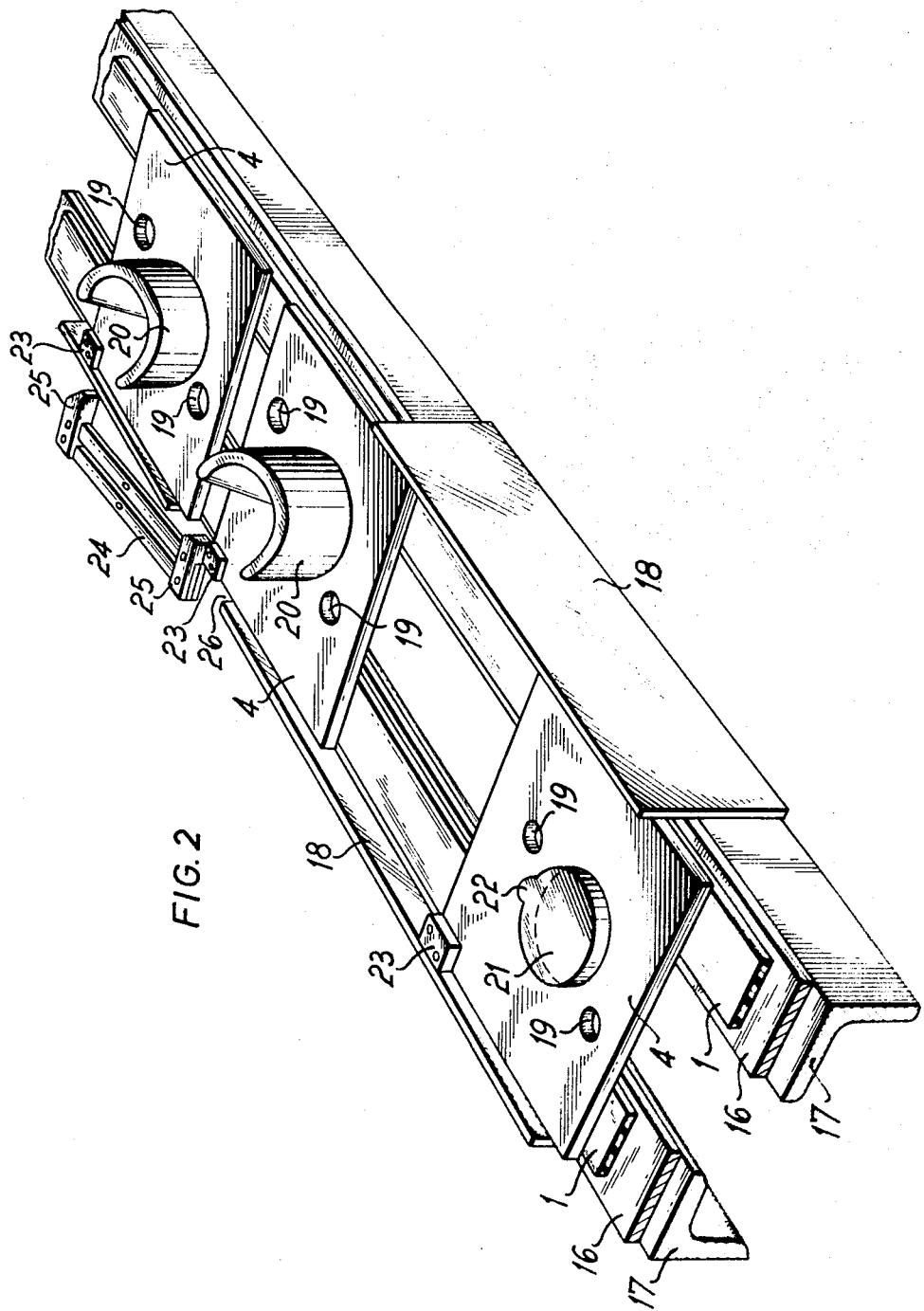
FIG. 2
INVENTORS:
Georg KERN
Heinz WILKE
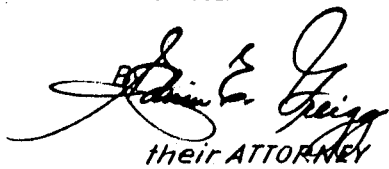
their ATTORNEY

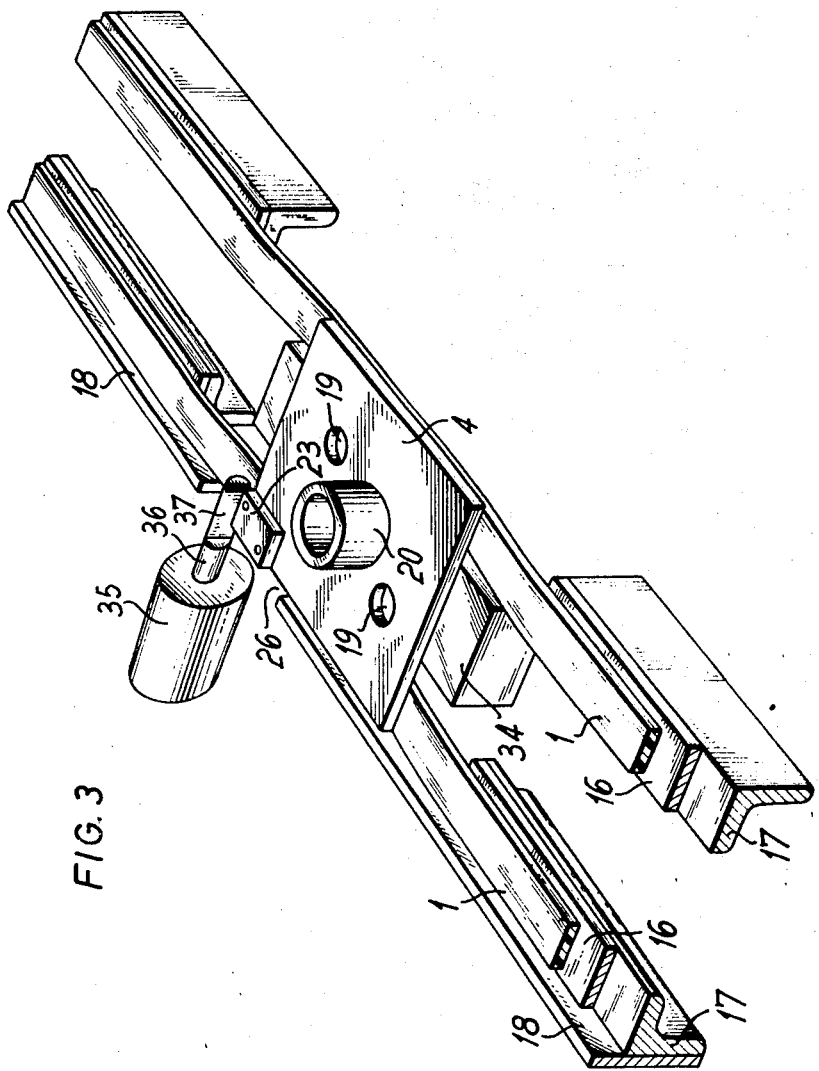

CONVEYOR TRACK FOR ASSEMBLY LINE PRODUCTION

The invention relates to a conveyor track arrangement for assembly line production comprising two endless belts traveling continuously at constant speed and which are positioned in side-by-side relation on slide rails. On the horizontal sections of the conveyor belts are provided platelike carriers with means for the correct positioning of the workpieces to be picked up, and which workpiece carriers are moved along by the conveyor belts by means of static friction and can be detained at respective work stations.

In a known form of such a conveyor track the workpiece carriers are lifted from the conveyor belts at the work stations so that the static friction between the workpiece carriers and the conveyor belts is interrupted and the carriers remain at a standstill until—after completion of the work operation—they are again lowered upon the two conveyor belts. See, for example, German Published application Pat. No. 1,103,240.

For this purpose, each workpiece carrier is provided at one lateral side with a projection, and at each work station are provided means, such as an elevating ramp, a skidway, several swinging and latching levers, rollers and springs.

When the projection slides upon the ramp adjacent the front conveyor belt, the workpiece carrier, at this point, is lifted from the front conveyor belt at its front longitudinal side only, and then by means of a switch lever, which is swung by the projection, the carrier is shifted transversally to the conveyor track to a second conveyor belt, and thus with its other longitudinal side is shoved upon the skidway adjacent the rear conveyor belt and consequently also lifted from the rear conveyor belt.

The known conveyor track, therefore, has the disadvantage that the stopping device, which is required at each work station, consists of a large number of movable parts, which makes it very expensive and, further, that the workpiece carrier for lifting purposes has to be displaced transversally to the conveyor track in a cumbersome manner.

The object of this invention is to provide a conveyor track with a simple device for stopping the workpiece carriers and detaining them in a correct position.

This problem is solved by the present invention in that the workpiece carriers are detainable at the work stations by means of protruding stopping means which can be projected into their path, and that during the stopping of the workpiece carriers, the static friction between the workpiece carriers and the conveyor belts is transformed into a sliding friction.

The stopping device, which consists of a protruding barrier and which is movable into and out of the path of the workpiece carrier, consists of a very simple construction and, therefore, operates without interruptions. The sliding friction presses the workpiece carrier continuously against the stopping means and thus holds it in the desired exact work position.

According to a further suitable development of this invention, the conveyor belts are made of abrasion-resistant material with a low friction coefficient with respect to metals. Thus, the friction between the conveyor belt and the slide rail, and—at the work stations—between the conveyor belt and the workpiece carriers, is kept small, and thus a lifting of the workpiece carriers at the work stations is not necessary. The low degree of the sliding friction has the further advantage that with one single stop several workpiece carriers are backed up behind each other and can be stopped at the precise position for the working operation.

Thus, by backing up and singularizing the advancement of the workpiece carriers, the dwell periods can also be easily maintained in cases when variable working times for each work operation are involved.

It is particularly convenient to provide at the sides of the conveyor path guide rails to prevent accidental displacement of the workpiece carriers transversally relative to the conveying direction.

Other objects and advantages will become apparent from a study of the following detailed specification taken in conjunction with the drawings, in which:

FIG. 2 is an enlarged sectional view of FIG. 1 with the upper portions of the conveyor belts, details of the workpiece carriers and of the stop means, as well as of the slide rails and carriers which support the conveyor belts; and FIG. 3 is an enlarged sectional view of FIG. 1 showing a work station for exerting pressure forces on the workpiece and with a second embodiment of the stop means.

Figure 1:
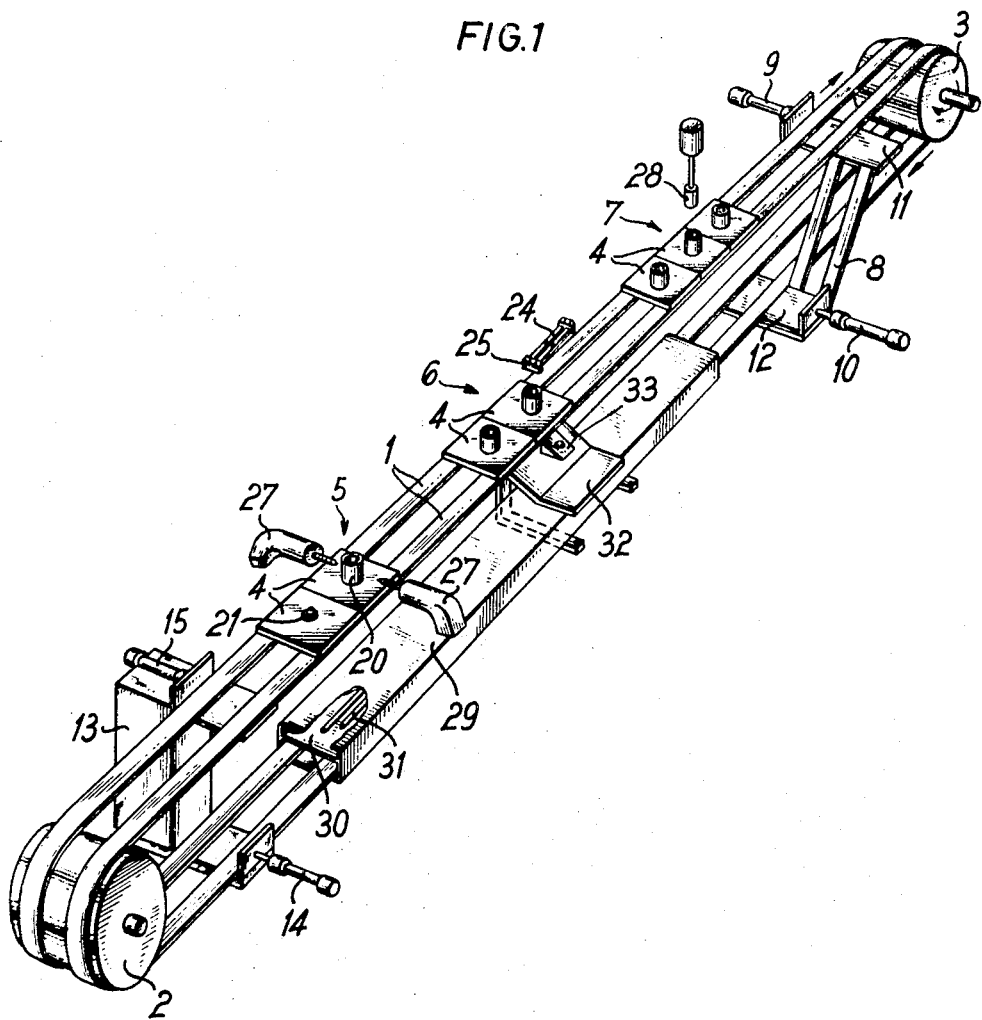
FIG. 1 is a perspective view of a conveyor track with two endless, parallel-arranged conveyor belts, but without the slide rails which support the conveyor belts.

Two endless belts 1 of equal length embrace in a driving-belt-like manner two pulleys 2, 3, the axes of which are positioned in a horizontal plane parallel to each other. The pulley 3 (in FIG. 1 to the right) is driven in a clockwise direction by a motor (not shown) so that the two upper flights of the conveyor belts 1 (in FIG. 1) are running from left to right and the two lower flights from right to left.

The workpiece carriers 4 are rectangular plates and they are placed at one end of the conveyor path (left hand side in FIG. 1) upon the upper flights or portions of the conveyor belts 1 and are carried along the conveyor belts by means of the static friction thereof to the work stations 5–7.

At the end of the conveyor path (right hand side in FIG. 1) there is laterally positioned a skidway 8 with two pushers or slide bars 9 and 10. The upper pusher 9, situated at the downstream end of the upper flights serves to laterally displace a workpiece carrier 4 onto an upper platform 11 of the skidway. From there the workpiece carrier, by means of its gravity, slides onto the lower platform 12 and there, by means of the lower pusher or slide bar 10, situated at the upstream end of the lower flights is pushed onto the two lower flights or portions of the conveyor belts 1. The latter then transport the empty workpiece carrier 4 beneath the work stations to the left end of the conveyor path (that is, the downstream end of the lower flights) where, by means of an elevator 13 and two pushers 14, 15, the carrier will be transported to the upstream end of the two upper flights of the conveyor belts 1 and loaded with a new workpiece.

The two conveyor belts 1 are composed of an abrasion-resistant, flexible material, for example, polyamide. Their horizontal sections are positioned in each instance on a slide rail 16 (FIG. 2) made of a drawn flat steel bar. These conveyor belt portions, together with the workpiece carriers 4 and the slide rails 16, are carried by two parallel spaced-apart profile bars 17 of steel which have an L-shaped cross section.

Guide rails 18 are laterally affixed to the rails to prevent an accidental, lateral displacement of the workpiece carriers 4.

The workpiece carriers 4 each have two bore holes 19 which are located in the area of the open space between the two conveyor belts 1 and into which bore holes two work-positioning posts (not shown) can be inserted from beneath to accurately position the workpiece carriers with the workpieces at certain machining operation stations, to rotate them by 90°, or to lift them off the conveyor belt.

For receiving one of the hollow cylindrical workpieces 20 upon a workpiece carrier 4, the latter are provided with a suitable centering projection 21 which fits into an aperture of the workpiece. A projection or nose portion 22 carried by the centering projection 21 and a corresponding recess on the workpiece 20 prevent an accidental rotation of the workpiece relative to the workpiece carrier 4.

Each workpiece carrier 4 is provided with an abutment lug 23 at its left front leading edge which cooperates with the stop means 24 arranged at the work stations. The latches 25 of the stop means are movable transversally of the conveyor path and protrude through the recesses 26 in the guide rails or bars 18 and into the path of travel of the abutment lug 23 for stopping the workpiece at the station.

The stop means 24 (FIG. 2) comprises two latches 25, connected to each other by two swingable arms, one of which always remains in a latching position. Thus, it is achieved that during unlatching, only one workpiece carrier leaves the work station.

At the first work station 5 there are positioned two boring machines 27 (FIG. 1); at the second work station 6 assembling is done by hand; and at the third work station 7 parts 28 are inserted into the hollow cylindrical workpiece 20.

The profile bars 17 supporting the upper portions of the conveyor belts are sufficiently high above the floor to enable a person to do work at the conveyor belts in a standing or upright position.

The lower portions of the conveyor belts are enveloped by a cover 29 (FIG. 1) which latter allows sufficient space for the transportation of the empty workpiece carriers 4. Furthermore, the cover 29 also provides a housing 30 for electric cables and servicing conduits 31 for compressed air or the like.

The effective height between the profile bars 17 which support the upper conveyor belt portions and the cover 29 enveloping the lower conveyor belt portions is of such dimension that space in this area will be provided for the legs of a seated worker.

At the working place provided for the seated worker, there is also provided on the floor an adjustable footrest 32 provided with a foot-operated switch 33 which actuates the latch of the stop means.

FIG. 3 shows a work place at which greater than normal downwardly directed forces are to be applied vertically to the workpiece 20 and thus to the workpiece carrier 4, for example, to drive a bushing into the hollow cylindrical workpiece.

Here the slide rails 16 and the track supporting profile bars 17 are spaced apart a distance corresponding approximately to twice the length of the workpiece carrier 4 so that the two conveyor belt portions in this area are left without any support from beneath and therefore are inclined to sag easily.

An anvil 34 provided with a horizontal upper face is arranged between the two conveyor belts 1 a short distance from the lower surface of the workpiece carrier 4. The horizontal distance between the workpiece carrier 4 and the anvil 34 is such that the workpiece carrier does not come into contact with the anvil 34 inasmuch as it is supported only by its own weight and that of the workpiece. If, however, the unsupported portions of the conveyor belts 1 are further depressed downwardly by means of the force of a press, then the workpiece carrier 4 becomes seated on the anvil 34. Now greater forces can be exerted upon the workpiece carrier 4 without imposing undue loads upon the conveyor track and without the necessity of lifting the workpiece carrier 4 off the conveyor track.

The stop means consists of a cylinder 35 with a pneumatically actuated piston with the cylinder being affixed to the conveyor track in a direction transversally of the conveyor belts 1. The piston rod 36, which projects from the front end of the cylinder terminates as a latch 37 with a vertical surface that can be moved into the path of the abutment lugs 23 to stop the workpiece carrier 4.

The stop means at this work station is arranged in such a manner that the workpiece carrier 4 will be stopped at about the center of the gap between the slide rails 16 and the profile bars 17.

What is claimed is:

1. A conveyor track for assembly line production comprising,
    A. an endless conveyor belt means including an upper and a lower flight, each having an upstream and downstream end
    B. means for driving said conveyor belt means,
    C. workpiece carriers supported on and advanced by said upper flight by static friction,
    D. laterally disposed movable means adjacent said upper flight, said movable means being projectable into the path of travel of said workpiece carriers to interrupt the travel thereof at predetermined locations along said upper flight,
    E. a skidway situated adjacent said conveyor belt means at one end thereof, said skidway extending from a level at the downstream end of said upper flight downwardly to a level at the upstream end of said lower flight,
    F. first pusher means situated at the downstream end of said upper flight next to said skidway for laterally moving said workpiece carriers off said upper flight and onto said skidway for sliding thereon,
    G. a second pusher means situated at the upstream end of said lower flight next to said skidway for laterally moving said workpiece carriers from said skidway onto said lower flight,
    H. an elevator situated adjacent said conveyor belt means at one end thereof remote from said skidway, said elevator extending from a level at the downstream end of said lower flight upwardly to a level at the upstream end of said upper flight,
    I. a third pusher means situated at the downstream end of said lower flight next to said elevator for laterally moving said workpiece carriers off said lower flight and onto said elevator for being lifted thereby and
    J. a fourth pusher means situated at the upstream end of said upper flight next to said elevator for laterally moving said workpiece carriers from said elevator onto said upper flight.

2. A conveyor track for assembly line production as claimed in claim 1, wherein said conveyor belt means is formed of two spaced, parallel endless conveyor belts each having coplanar upper flights and coplanar lower flights, said conveyor track further includes parallel extending slide rails supporting at least predetermined portions of said upper flights and defining between themselves an unobstructed free space having a width substantially equal to the distance between said conveyor belts.

3. A conveyor track for assembly line production as claimed in claim 2, including supplemental means resistant to bending, said supplemental means defining a free space coextensive with the free space between said slide rails.

4. A conveyor track for assembly line production as claimed in claim 2, including anvil means positioned at a location defined in (D) beneath said upper flights and between said spaced belts.

5. A conveyor track for assembly line production as claimed in claim 1, in which said conveyor belt comprise a wear-resistant material with a low coefficient of friction relative to metals.

6. A conveyor track for assembly line production as claimed in claim 5, in which the wear-resistant material is a polyamide.

7. A conveyor track for assembly line production as claimed in claim 1, including guide bars provided at least in the area adjacent the locations defined in (D) to prevent accidental lateral displacement of the workpiece carriers.

8. A conveyor track for assembly line production as claimed in claim 4, said slide rails are discontinued at said last-named location to provide a free space under the belts for permitting the latter to yield downwardly to a relatively large vertical force imparted on the workpiece carrier for allowing the latter to be temporarily supported by said anvil.

* * * * *